US012614718B2

(12) United States Patent
Zhang et al.

(10) Patent No.: US 12,614,718 B2
(45) Date of Patent: Apr. 28, 2026

(54) ANODE MATERIAL, ELECTROCHEMICAL DEVICE AND ELECTRONIC DEVICE INCLUDING THE SAME

(71) Applicant: Ningde Amperex Technology Limited, Ningde City (CN)

(72) Inventors: Chengbo Zhang, Ningde City (CN); Yuhao Lu, Ningde City (CN); Yuansen Xie, Ningde City (CN)

(73) Assignee: Ningde Amperex Technology Limited, Ningde (CN)

( * ) Notice: Subject to any disclaimer, the term of this patent is extended or adjusted under 35 U.S.C. 154(b) by 942 days.

(21) Appl. No.: 17/585,663

(22) Filed: Jan. 27, 2022

(65) Prior Publication Data

US 2022/0158175 A1 May 19, 2022

Related U.S. Application Data

(63) Continuation of application No. PCT/CN2019/128857, filed on Dec. 26, 2019.

(51) Int. Cl.
| *H01M 4/36* | (2006.01) |
| *H01M 4/02* | (2006.01) |
| *H01M 4/485* | (2010.01) |
| *H01M 10/0525* | (2010.01) |

(52) U.S. Cl.
CPC .......... *H01M 4/366* (2013.01); *H01M 4/485* (2013.01); *H01M 10/0525* (2013.01); *H01M 2004/021* (2013.01); *H01M 2004/027* (2013.01)

(58) Field of Classification Search
CPC .... H01M 4/366; H01M 4/485; H01M 4/0471; H01M 4/483; H01M 4/386; H01M 4/62; H01M 4/625; H01M 10/0525; H01M 10/052; H01M 2004/021; H01M 2004/027; H01M 2220/00; Y02E 60/10
See application file for complete search history.

(56) References Cited

U.S. PATENT DOCUMENTS

| 2016/0190570 A1 | 6/2016 | Lee et al. |
| 2017/0352883 A1 | 12/2017 | Cho et al. |
| 2018/0342757 A1* | 11/2018 | Choi ..................... H01M 4/386 |

FOREIGN PATENT DOCUMENTS

| CN | 106816594 A | 6/2017 |
| CN | 107887587 A | 4/2018 |
| CN | 108461723 A | 8/2018 |
| CN | 109636254 A | 4/2019 |

(Continued)

OTHER PUBLICATIONS

Zhu et al. "Prelithiated Surface Oxide Layer Enabled High-Performance Si Anode for Lithium Storage" .ACS Appi .. 'Ÿkiter. Jr.terfoces 2019, 1 1, 183005-18312.*

(Continued)

*Primary Examiner* — Kiran Quraishi Akhtar
(74) *Attorney, Agent, or Firm* — Maier & Maier, PLLC

(57) ABSTRACT

An anode material includes silicon-based particles, the silicon-based particles include a silicon-containing substrate; at least a part of the surface of the silicon-containing substrate has an $M_ySiO_z$ layer; M includes Li, Mg, Ca, Sr, Ba, Al, Ti, Zn, or any combination thereof; and $0<y<3$, and $0.5<z<6$. The anode material has relatively high first Coulombic efficiency and good cycle performance.

23 Claims, 5 Drawing Sheets

(56) References Cited

FOREIGN PATENT DOCUMENTS

| CN | 109755500 | A | 5/2019 | | |
| CN | 109841823 | A | 6/2019 | | |
| CN | 110416543 | A | 11/2019 | | |
| CN | 110582876 | A | 12/2019 | | |
| JP | 2016506035 | A | 2/2016 | | |
| JP | 2017204374 | A | 11/2017 | | |
| JP | 2019043821 | A | 3/2019 | | |
| KR | 20120139450 | * | 12/2012 | ........ | H01M 10/0525 |
| KR | 20120139450 | A | 12/2012 | | |
| KR | 20180052683 | A | 5/2018 | | |
| KR | 20190043856 | A | 4/2019 | | |
| WO | 2015145521 | A1 | 10/2015 | | |
| WO | 2019078690 | A2 | 4/2019 | | |
| WO | 2019093820 | A1 | 5/2019 | | |
| WO | 2019151774 | A1 | 8/2019 | | |
| WO | 2019168352 | A1 | 9/2019 | | |

OTHER PUBLICATIONS

International Search Report for International Application PCT/CN2019/128857 mailed Sep. 24, 2020.

Written Opinion for International Application PCT/CN2019/128857 mailed Sep. 24, 2020.

Yu Zhang, et al.; An affordable manufacturing method to boost the initial Coulombic efficiency of disproportionated SIO lithium-ion battery anodes; Journal of Power Sources 426 (2019) 116-123.

First Office Action for Chinese patent application 201911368750.3, dated Sep. 24, 2024, 13 pages.

First Office Action for Indian patent application 202137935245 dated Sep. 24, 2024, 5 pages.

European Search Report dated Dec. 13, 2022, corresponding to EP Application No. 19946252.4.

European Office Action, dated Aug. 16, 2023, corresponding to EP Application No. 19946252.4.

Japanese Office Action (Notice of Reasons for Refusal), dated Apr. 5, 2022, corresponding to JP Application No. 2021-517977.

Japanese Office Action (Decision of Refusal), dated Oct. 25, 2022, corresponding to JP Application No. 2021-517977.

Korean Office Action, dated Aug. 21, 2023, corresponding to KR Application No. 10-2021-7009631.

Zhu, Yuanchao et al, "Prelitlliated Surface Oxide Layer Enabled Hig••Performance Si Anode for Lithium Storage", Applied Materials & Interfaces, vol. 11, No. 20, May 22, 2019, pp. 18305-18312, XP93004516.

Yom, Jee Ho et al, "Improvement of irreversible behavior of SiO anodes for lithium ion batteries by a solid state reaction at a high temperature", Journal of Power Sources, vol. 311, Apr. 1, 2016, pp. 159-166, XP055 741823.

Han, Sang-Don et al, "Intrinsic Properties of Individual Inorganic Silicon•Electrolyte Interphase Constituents", Applied Materials & Interfaces, vol. 11, No. 50, Nov. 18, 2019, pp. 46993-47002, XP93004542.

Decision to Grant a Patent, dated May 30, 2023, corresponding to JP Application No. 2021-517977.

* cited by examiner

ANODE MATERIAL, ELECTROCHEMICAL DEVICE AND ELECTRONIC DEVICE INCLUDING THE SAME

CROSS REFERENCE TO RELATED APPLICATIONS

The present application is a continuation of National Phase Application PCT application PCT/CN2019/128857 filed on Dec. 26, 2019.

BACKGROUND

1. Technical Field

The present application relates to the field of energy storage, and more particularly to an anode material, an electrochemical device and an electronic device including the same particularly a lithium ion battery.

2. Description of the Related Art

With the popularization of consumer electronics, such as notebook computers, mobile phones, tablet computers, mobile power supplies, and unmanned aerial vehicles, the requirements for electrochemical devices used therein are becoming stricter. For example, a battery is not only required to be light in weight, but is also required to have high capacity and relatively long service life. Lithium ion batteries have occupied leading position in the market due to their outstanding advantages, such as high energy density, excellent safety, no memory effect and long service life.

SUMMARY

Embodiments of the present application provide an anode material and a method for preparing the anode material, to solve at least one of the problems existing in the related art to some extent. The embodiments of the present application further provide an anode using the anode material, an electrochemical device and an electronic device.

In one embodiment, the present application provides an anode material. The anode material includes silicon-based particles. The silicon-based particles include a silicon-containing substrate, at least a part of the surface of the silicon-containing substrate has an $M_ySiO_z$ layer; wherein M includes Li, Mg, Ca, Sr, Ba, Al, Ti, Zn, or any combination thereof; and $0<y<3$, and $0.5<z<6$.

In one embodiment, the present application provides a method for preparing an anode material, the method includes:

(1) performing thermal oxidization treatment on the surface of a silicon-containing substrate to obtain a silicon material with silicon dioxide on the surface; and (2) mixing the silicon material with silicon dioxide on the surface and an M source, and heat-treating the mixed material at 400 to 1600° C. for 1 to 5 hr to obtain the anode material;

wherein M includes Li, Mg, Ca, Sr, Ba, Al, Ti, Zn, or any combination thereof.

In another embodiment, the present application provides an anode, including the anode material according to the embodiments of the present application.

In another embodiment, the present application provides an electrochemical device, including the anode according to the embodiments of the present application.

In another embodiment, the present application provides an electronic device, including the electrochemical device according to the embodiments of the present application.

According to the present application, by designing and synthesizing a silicon core-shell composite structure, direct contact between silicon particles and an electrolytic solution is avoided, thereby improving the problem of cyclic capacity attenuation caused by a side reaction between the surfaces of the particles and the electrolytic solution in a silicon material cycle process. The anode material of the present application has relatively high initial coulombic efficiency and relatively good cycle performance.

Additional aspects and advantages of the embodiments of the present application will be described or shown in the following description or interpreted by implementing the embodiments of the present application

BRIEF DESCRIPTION OF THE DRAWINGS

Drawings necessary to describe the embodiments of the present application or the prior art will be briefly illustrated so as to facilitate the description of the embodiments of the present application. Obviously, the accompanying drawings show only some of the embodiments of the present application. For those skilled in the art, the drawings of other embodiments can still be obtained according to the structures illustrated in the drawings without any creative effort.

DETAILED DESCRIPTION

Figure 1:
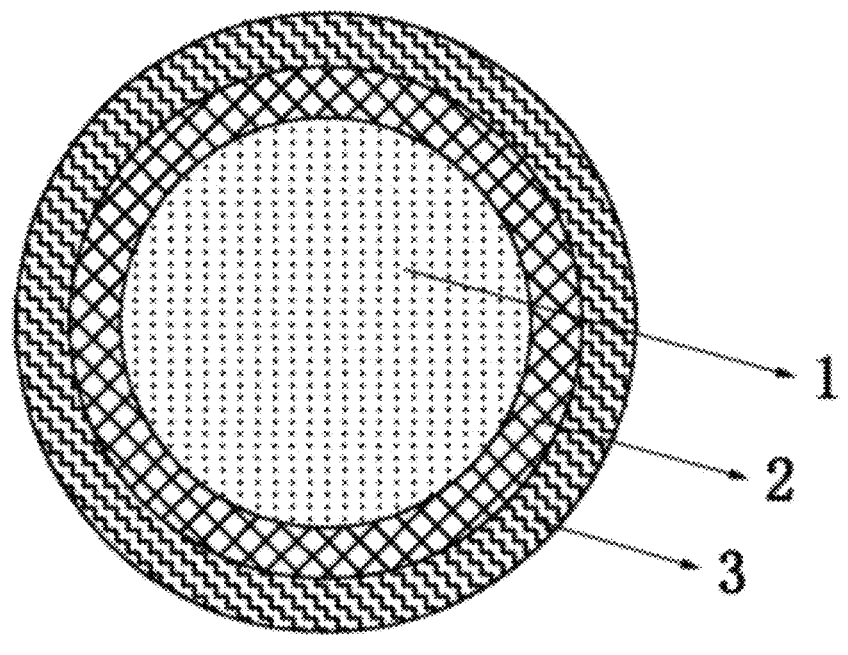
FIG. 1 illustrates a schematic structural diagram of silicon-based particles in an anode material in one embodiment of the present application.

The embodiments of the present application will be described in detail below. The embodiments of the present application should not be interpreted as limitations to the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

I. Anode Material

An embodiment of the present application provides an anode material, including silicon-based particles, the silicon-based particles include a silicon-containing substrate, at least a part of the surface of the silicon-containing substrate has an $M_ySiO_z$ layer; wherein M includes Li, Mg, Ca, Sr, Ba, Al, Ti, Zn, or any combination thereof; and $0<y<3$, and $0.5<z<6$.

In some embodiments, when M includes Li, M further includes at least one of Mg, Ca, Sr, Ba, Al, Ti, or Zn.

In some embodiments, the $M_ySiO_z$ layer includes $Li_2SiO_3$, $Li_2Si_2O_5$, $Mg_2SiO_4$, $MgSiO_3$, $CaSiO_3$, $SrSiO_3$, $BaSiO_3$, $Al_2SiO_5$, $TiSiO_4$, $Zn_2SiO_4$, or any combination thereof.

In some embodiments, when the $M_ySiO_z$ layer includes $Li_2SiO_3$ and/or $Li_2Si_2O_5$, the $M_ySiO_z$ layer further includes at least one of $Mg_2SiO_4$, $MgSiO_3$, $CaSiO_3$, $SrSiO_3$, $BaSiO_3$, $Al_2SiO_5$, $TiSiO_4$, or $Zn_2SiO_4$.

In some embodiments, the $M_ySiO_z$ layer includes $Li_2SiO_3$ and $Mg_2SiO_4$.

In some embodiments, the thickness of the $M_ySiO_z$ layer is about 50 to 200 nm. In some embodiments, the thickness of the $M_ySiO_z$ layer is about 50 to 150 nm. In some embodiments, the thickness of the $M_ySiO_z$ layer is about 70 nm, about 90 nm, about 100 nm, about 120 nm, about 140 nm, about 160 nm, about 180 nm, or a range consisting of any two of these thicknesses.

In some embodiments, at least a part of the surface of the $M_ySiO_z$ layer has a carbon layer. In some embodiments, the carbon layer includes carbon nanotubes, carbon nanoparticles, carbon fibers, graphene, conductive carbon black, or any combination thereof. In some embodiments, the carbon nanotubes include single-wall carbon nanotubes, multi-wall carbon nanotubes, or any combination thereof.

In some embodiments, the thickness of the carbon layer is about 1 to 500 nm. In some embodiments, the thickness of the carbon layer is about 100 to 400 nm. In some embodiments, the thickness of the carbon layer is about 10 nm, about 50 nm, about 100 nm, about 150 nm, about 200 nm, about 250 nm, about 300 nm, about 350 nm, about 400 nm, about 450 nm, or a range consisting of any two of these thicknesses.

In some embodiments, a weight percentage of the element M is about 0.5 to 15 wt % based on the total weight of the silicon-based particles. In some embodiments, a weight percentage of the element M is about 1 to 12 wt % based on the total weight of the silicon-based particles. In some embodiments, a weight percentage of the element M is about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or a range consisting of any two of these weight percentages, based on the total weight of the silicon-based particles.

In some embodiments, a weight percentage of the element Li is about 0 to 5 wt % based on the total weight of the silicon-based particles. In some embodiments, a weight percentage of the element Li is about 1 to 4 wt % based on the total weight of the silicon-based particles. In some embodiments, a weight percentage of the element Li is about 0.5 wt %, about 1 wt %, about 1.5 wt %, about 2 wt %, about 2.5 wt %, about 3 wt %, about 3.5 wt %, about 4 wt %, about 4.5 wt %, or a range consisting of any two of these weight percentages, based on the total weight of the silicon-based particles.

In some embodiments, a weight percentage of the element Mg is about 0.5 to 10 wt % based on the total weight of the silicon-based particles. In some embodiments, a weight percentage of the element Mg is about 1 to 9 wt % based on the total weight of the silicon-based particles. In some embodiments, a weight percentage of the element Mg is about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, or a range consisting of any two of these weight percentages, based on the total weight of the silicon-based particles.

In some embodiments, a weight percentage of the carbon layer is about 0.1 to 10 wt % based on the total weight of the silicon-based particles. In some embodiments, a weight percentage of the carbon layer is about 0.5 to 8 wt % based on the total weight of the silicon-based particles. In some embodiments, a weight percentage of the carbon layer is about 1 wt %, about 1.5 wt %, about 2 wt %, about 2.5 wt %, about 3 wt %, about 4 wt %, about 5 wt %, about 6 wt %, about 7 wt %, about 8 wt %, about 9 wt %, or a range consisting of any two of these weight percentages, based on the total weight of the silicon-based particles.

In some embodiments, the silicon-containing substrate includes $SiO_x$, and $0.6 \leq x \leq 1.5$.

In some embodiments, the silicon-containing substrate includes Si grains, SiO, $SiO_2$, SiC, or any combination thereof.

In some embodiments, the silicon-containing substrate includes micro Si, nano Si, or a combination thereof. In some embodiments, the average particle size of the micro Si is about 1 to 10 μm. In some embodiments, the average particle size of the micro Si is about 1 μm, about 1.5 μm, about 2 μm, about 2.5 μm, about 3 μm, about 3.5 μm, about 4 μm, about 5 nm, about 6 μm, about 7 μm, about 8 μm, about 9 μm, about 10 μm, or a range consisting of any two of these average particle sizes.

In some embodiments, the average particle size of the nano Si is about 1 to 100 nm. In some embodiments, the average particle size of the nano Si is about 10 to 80 nm. In some embodiments, the average particle size of the nano Si is about 5 nm, about 10 nm, about 15 nm, about 20 nm, about 25 nm, about 30 nm, about 40 nm, about 50 nm, about 60 nm, about 70 nm, about 80 nm, about 90 nm, or a range consisting of any two of these average particle sizes.

In some embodiments, the average particle size of the silicon-based particles is about 500 nm to 30 μm. In some embodiments, the average particle size of the silicon-based particles is about 1 μm to 25 μm. In some embodiments, the average particle size of the silicon-based particles is about 5 μm, about 10 μm, about 15 μm, about 20 μm, or a range consisting of any two of these numerical values.

In some embodiments, the specific surface area of the silicon-based particles is about 2.5 to 15 $m^2/g$. In some embodiments, the specific surface area of the silicon-based particles is about 5 to 10 $m^2/g$. In some embodiments, the specific surface area of the silicon-based particles is about 3 $m^2/g$, about 4 $m^2/g$, about 6 $m^2/g$, about 8 $m^2/g$, about 10 $m^2/g$, about 12 $m^2/g$, about 14 $m^2/g$, or a range consisting of any two of these numerical values.

II. Preparation Method of an Anode Material

An embodiment of the present application provide a method for preparing any of the above anode materials. The method includes the following steps:

(1) performing thermal oxidization treatment on the surface of a silicon-containing substrate to obtain a silicon material with silicon dioxide on the surface; and (2) mixing the silicon material with silicon dioxide on the surface and an M source, and heat-treating the mixed material at about 400 to 1600° C. for about 1 to 5 hr to obtain the anode material;

wherein M includes Li, Mg, Ca, Sr, Ba, Al, Ti, Zn, or any combination thereof.

In some embodiments, the anode material includes silicon-based particles. In some embodiments, the anode material is silicon-based particle.

In some embodiments, the thermal oxidization treatment includes performing thermal oxidization treatment on the silicon-containing substrate in oxygen-containing gas in a range of about 400 to 1500° C. for about 2 to 12 hr.

In some embodiments, the oxygen-containing gas includes pure oxygen, water vapor, air, or any combination thereof.

In some embodiments, the thermal oxidation treatment temperature is about 400 to 1100° C. In some embodiments, the thermal oxidation treatment temperature is about 600 to 1000° C. In some embodiments, the thermal oxidation treatment temperature is about 500° C., about 600° C., about 700° C., about 800° C., about 900° C., about 1000° C., about 1100° C., about 1200° C., about 1300° C., or a range consisting of any two of these temperatures.

In some embodiments, the thermal oxidation treatment time is about 2 to 10 hr. In some embodiments, the thermal oxidation treatment time is about 4 to 8 hr. In some embodiments, the thermal oxidation treatment duration is about 3 hr, about 4 hr, about 5 hr, about 6 hr, about 7 hr, about 8 hr, about 9 hr, about 10 hr, or a range consisting of any two of these times.

In some embodiments, the thermal oxidation treatment is performed in a tube furnace, a box furnace, or a rotary kiln.

In some embodiments, a weight ratio of the silicon-containing substrate to the M source is about 10:1 to 120:1. In some embodiments, a weight ratio of the silicon-containing substrate to the M source is about 10:1 to 50:1. In some embodiments, a weight ratio of the silicon-containing substrate to the M source is about 15:1, about 20:1, about 25:1, about 30:1, about 35:1, about 40:1, about 50:1, about 55:1, about 60:1, about 70:1, about 80:1, about 90:1, about 100:1, about 110:1, about 120:1, or a range consisting of any two of these numerical values.

In some embodiments, the M source includes a magnesium source, an aluminum source, a lithium source, or any combination thereof. In some embodiments, the magnesium source includes magnesium chloride, magnesium acetate, magnesium sulfate, magnesium hydroxide, magnesium carbonate, magnesium powder, or any combination thereof.

In some embodiments, the aluminum source includes aluminum oxide, aluminum chloride, aluminum ethoxide, aluminum sulfate, aluminum nitrate, or any combination thereof.

In some embodiments, the lithium source includes lithium powder, lithium hydride, lithium oxide, lithium hydroxide, lithium carbonate, lithium aluminum hydride, lithium borohydride, or any combination thereof.

In some embodiments, the heat treatment in step (2) is performed under inert gas. In some embodiments, the inert gas includes helium, argon, nitrogen, or any combination thereof.

In some embodiments, the heat treatment in step (2) is performed in the tube furnace, the box furnace, or the rotary kiln.

In some embodiments, the heat treatment temperature in step (2) is about 500 to 1600° C. In some embodiments, the heat treatment temperature is about 800 to 1300° C. In some embodiments, the heat treatment temperature is about 600° C., about 700° C., about 800° C., about 900° C., about 1000° C. about 1100° C., about 1200° C., about 1300° C., about 1400° C., about 1500° C., or a range consisting of any two of these temperatures.

In some embodiments, the heat treatment time in step (2) is about 1 to 5 h. In some embodiments, the heat treatment time in step (2) is about 1.5 to 4 h. In some embodiments, the heat treatment time in step (2) is about 1.2 h, about 1.4 h, about 1.6 h, about 1.8 h, about 2 h, about 2.5 h, about 3 h, about 4 h, or a range consisting of any two of these times.

In some embodiments, the method includes a step of mixing the silicon material with silicon dioxide on the surface and a carbon source between step (1) and step (2). In some embodiments, ball milling is further included after mixing. In some embodiments, a silicon material with silicon dioxide and a carbon layer on the surface is obtained after the ball milling.

In some embodiments, a weight ratio of the silicon material with silicon dioxide on the surface to the carbon source is about 20:1 to 120:1. In some embodiments, a weight ratio of the silicon material with silicon dioxide on the surface to the carbon source is about 20:1, about 25:1, about 30:1, about 35:1, about 40:1, about 45:1, about 50:1, about 60:1, about 70:1, about 80:1, about 90:1, about 100:1, about 110:1, about 120:1, or a range consisting of any two of these ratios.

In some embodiments, the carbon source includes carbon nanotubes, carbon nanoparticles, carbon fibers, graphene, conductive carbon black, or any combination thereof. In some embodiments, the carbon nanotubes include single-wall carbon nanotubes, multi-wall carbon nanotubes, or any combination thereof.

In some embodiments, the ball milling is liquid-phase ball milling performed in a ball milling tank. In one embodiment, a drying step is further included after the ball milling.

In some embodiments, when M is Mg, Ca, Sr, Ba, Al, Ti, Zn, or any combination thereof, or when M is Li, step (2) only includes one doping step.

In some embodiments, when M includes Li and at least one of Mg, Ca, Sr, Ba, Al, Ti, and Zn at the same time, step (2) includes two doping steps, that is, firstly, the silicon material with silicon dioxide on the surface is doped with at least one of Mg, Ca, Sr, Ba, Al, Ti, and Zn according to the method described above, and then Li is doped according to the method described above.

The failure of silicon as the anode material is mainly caused by a series of problems caused by huge volume expansion after the silicon is intercalated with lithium, and the continuous thickening of a solid electrolyte interface (SEI) film caused by relatively high reactivity of the silicon surface and an electrolytic solution. The thickening of the SEI film continuously consumes reversible lithium, which leads to capacity attenuation. According to the present application, by designing and synthesizing a silicon core-shell composite structure, direct contact between silicon particles and the electrolytic solution is avoided, thereby improving the problem of cyclic capacity attenuation caused by a side reaction between the surfaces of the particles and the electrolytic solution during silicon material cycle.

A shell layer in the silicon core-shell composite structure may be $Li_2SiO_3$, $Li_2Si_2O_5$, $Mg_2SiO_4$, $MgSiO_3$, $CaSiO_3$, $SrSiO_3$, $BaSiO_3$, $Al_2SiO_5$, $TiSiO_4$, $Zn_2SiO_4$, or any combination thereof. When $Li_2SiO_3$, $Li_2Si_2O_5$, or a combination thereof exists in the shell layer, in order to improve the stability of the silicon core-shell composite structure to water, the shell layer may further contain at least one of $Mg_2SiO_4$, $MgSiO_3$, $CaSiO_3$, $SrSiO_3$, $BaSiO_3$, $Al_2SiO_5$, $TiSiO_4$, or $Zn_2SiO_4$.

The shell layer of the present application may further have a carbon layer. In this case, after the silicon material is oxidized, carbon coating is performed at first, and then the element M is doped. Under such a circumstance, the element M may proceed with a doping reaction with the silicon oxide shell layer by solid phase diffusion during thermal doping, thereby retaining the outermost carbon layer.

The anode material of the present application may significantly improve the cycle performance of a lithium ion battery prepared using the same, while the specific capacity and the first Coulombic efficiency do not change significantly.

FIG. 1 illustrates a schematic structural diagram of silicon-based particles in an anode material in one embodiment of the present application. An inner layer 1 is the silicon-containing substrate, a middle layer 2 is the $M_ySiO_z$ layer, and an outer layer 3 is the carbon layer.

Figure 2:
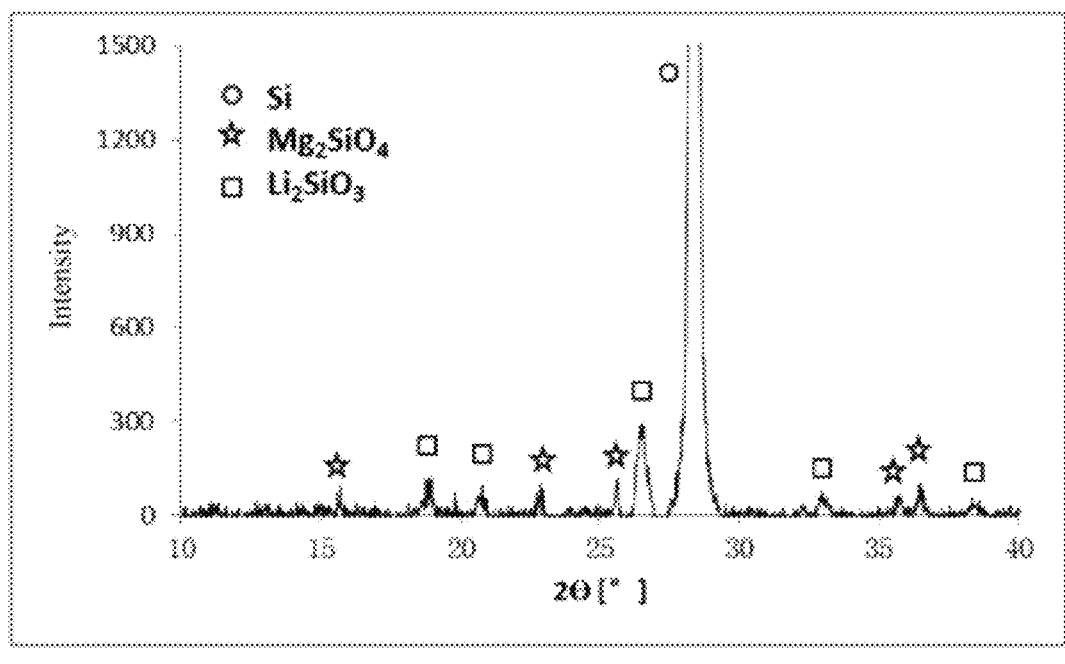
FIG. 2 shows an X-ray diffraction (XRD) pattern of silicon-based particles in an anode material in Embodiment 1 of the present application.

FIG. 2 shows an X-ray diffraction (XRD) pattern of silicon-based particles in an anode material in Embodiment 1 of the present application. It can be seen from FIG. 2 that the silicon-based particles in the anode material in Embodiment 1 contain $Li_2SiO_3$ and $Mg_2SiO_4$ at the same time, which demonstrates that the silicon-based core-shell composite structure contains $Li_2SiO_3$ and $Mg_2SiO_4$ components.

Figure 3:
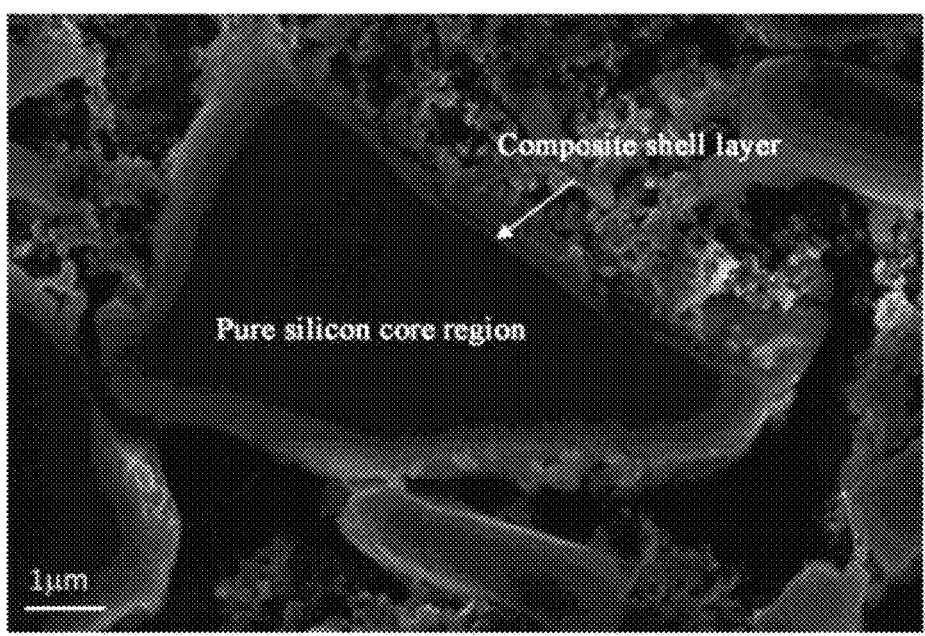
FIG. 3 shows a scanning electron microscopy (SEM) image of the cross section of the silicon-based particles in the anode material in Embodiment 1 of the present application.

FIG. 3 shows scanning electron microscopy (SEM) image of the cross section of the silicon-based particles in the anode material in Embodiment 1 of the present application. It can be seen from FIG. 3 that a composite shell layer exists in the silicon-based core-shell composite particles.

Figure 4:
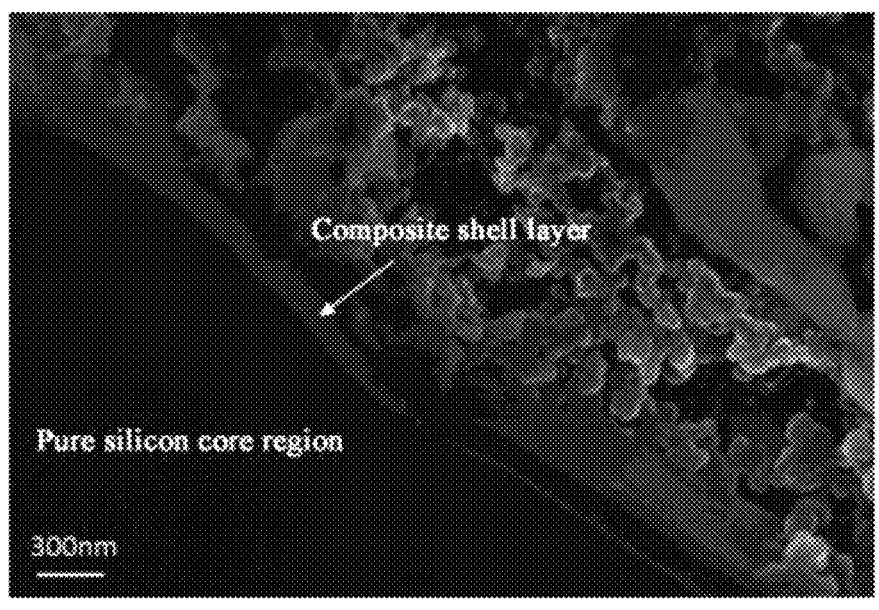
FIG. 4 shows a partially enlarged diagram of the scanning electron microscopy (SEM) image of the cross section of the silicon-based particles in the anode material in Embodiment 1 of the present application.

FIG. 4 shows a partially enlarged diagram of the scanning electron microscopy (SEM) image of the cross section of the silicon-based particles in the anode material in Embodiment 1 of the present application. It is clearer that the composite shell layer is present according to FIG. 4.

Figure 5A:
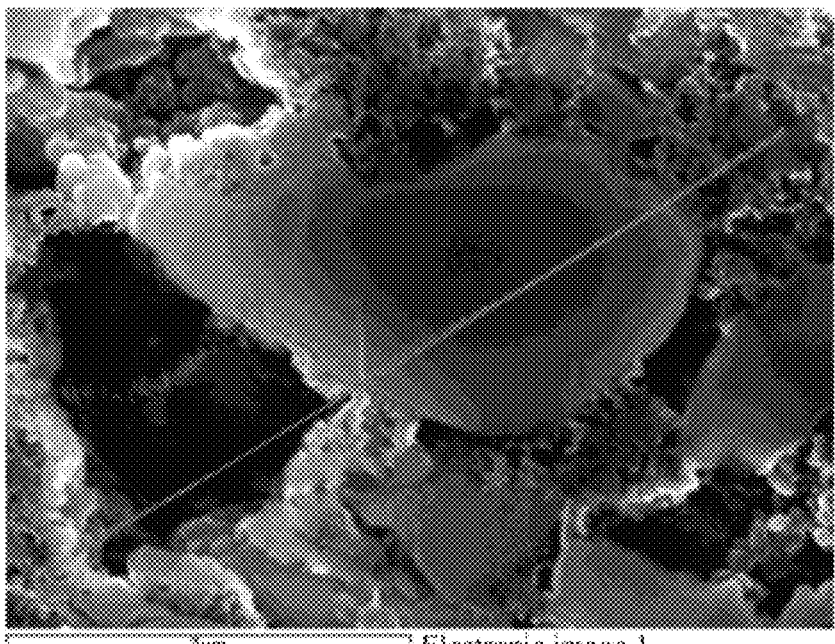
FIG. 5A shows a SEM image of the profile of the silicon-based particles in the anode material in Embodiment 1 of the present application.
Figure 5B:
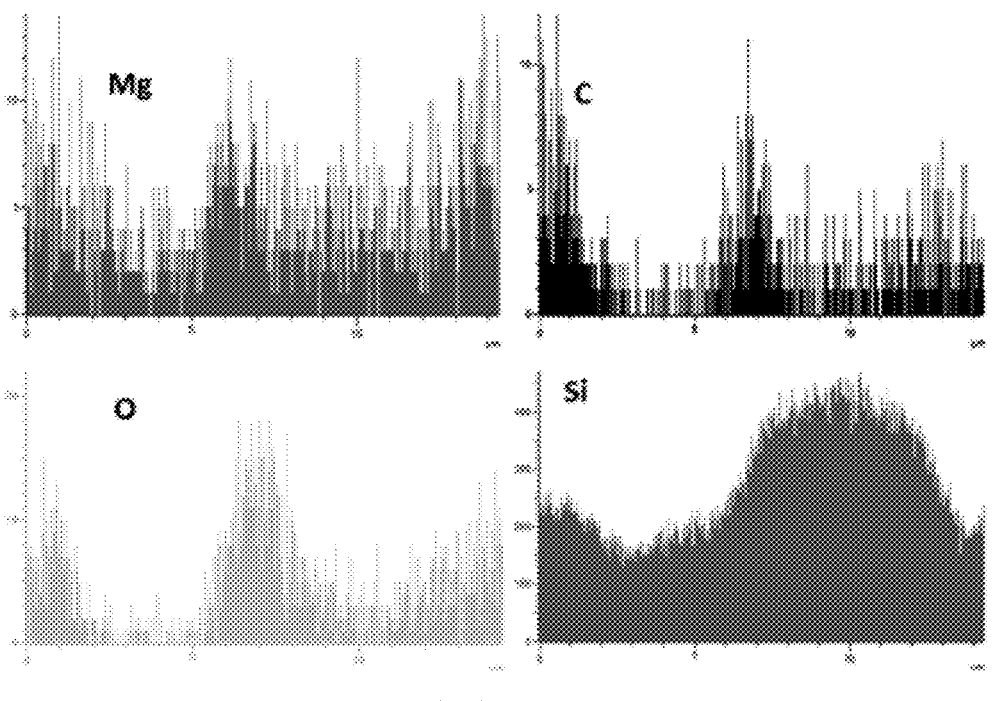
FIG. 5B shows a X-ray energy dispersive spectral analysis (EDS) image of the profile of the silicon-based particles in the anode material in Embodiment 1 of the present application.

FIG. 5A shows a SEM image of the profile of the silicon-based particles in the anode material in Embodiment 1 of the present application, and FIG. 5B shows a X-ray energy dispersive spectral analysis (EDS) image of the profile of the silicon-based particles in the anode material in Embodiment 1 of the present application. FIG. 5B shows that the magnesium content in the edge region of the silicon-based particles is relatively high, indicating the existence of a magnesium silicate shell layer. At the same time, carbon element signal in an outermost layer shows that a carbon layer exists on the surface of the silicon-based particles.

III. Anode

The embodiments of the present application provide an anode. The anode includes a current collector and an anode active material layer located on the current collector. The anode material layer includes an anode active material according to the embodiments of the present application.

In some embodiments, the anode active material layer includes a binder. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene-butadiene rubber, acrylated styrene-butadiene rubber, epoxy resin, or nylon.

In some embodiments, the anode active material layer includes a conductive material. In some embodiments, the conductive material includes, but is not limited to, natural graphite, artificial graphite, carbon black, acetylene black, Ketjen black, carbon fibers, metal powder, metal fibers, copper, nickel, aluminum, silver, or polyphenylene derivatives.

In some embodiments, the current collector includes, but is not limited to, a copper foil, a nickel foil, a stainless steel foil, a titanium foil, nickel foam, copper foam, or a polymer substrate coated with a conductive metal.

In some embodiments, the anode may be obtained by the following method: the anode active material, the conductive material, and the binder are mixed in a solvent to prepare slurry, and the current collector is coated with the slurry.

In some embodiments, the solvent may include, but is not limited to, deionized water or N-methylpyrrolidone.

IV. Cathode

A material capable of being applied to a cathode in the embodiment of the present application, a composition and a preparation method thereof include any technology disclosed in prior art. In some embodiments, the cathode is a cathode disclosed in U.S. Pat. No. 9,812,739B, which is incorporated into the present application by full text reference.

In some embodiments, the cathode includes a current collector and a cathode active material layer located on the current collector.

In some embodiments, the cathode active material includes, but is not limited to, lithium cobalt oxide ($LiCoO_2$), lithium nickel cobalt manganese (NCM) ternary material, lithium iron phosphate ($LiFePO_4$), or lithium manganese oxide ($LiMn_2O_4$).

In some embodiments, the cathode active material layer further includes a binder, and optionally includes a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene-butadiene rubber, acrylated styrene-butadiene rubber, epoxy resin, or nylon, and the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fibers, or any combination thereof. In some embodiments, the metal-based material is selected from metal powder, metal fibers, copper, nickel, aluminum, or silver. In some embodiments, the conductive polymer is a polyphenylene derivative.

In some embodiments, the current collector may include, but is not limited to, aluminum.

The cathode may be prepared by a preparation method known in the art. For example, the cathode may be obtained by the following method: an active material, a conductive material, and a binder are mixed in a solvent to prepare an active material composition, and the current collector is coated with the active material composition. In some embodiments, the solvent may include, but is not limited to, N-methylpyrrolidone.

V. Electrolytic Solution

An electrolytic solution that can be used in the embodiments of the present application may be an electrolytic solution known in the prior art.

In some embodiments, the electrolytic solution includes an organic solvent, lithium salt, and an additive. The organic solvent of the electrolytic solution according to the present application may be any organic solvent known in the art and capable of serving as a solvent of the electrolytic solution. Electrolytes used in the electrolytic solution according to the present application are not limited, and may be any electrolyte known in the art. The additive used in the electrolytic solution according to the present application may be any additive known in the art and capable of serving as an additive of the electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of organic lithium salt or inorganic lithium salt.

In some embodiments, the lithium salt includes, but is not limited to, lithium hexafluorophosphate (LiPF$_6$), lithium tetrafluoroborate (LiBF$_4$), lithium difluorophosphate (LiPO$_2$F$_2$), lithium bis(trifluoromethanesulfonyl)imide LiN (CF$_3$SO$_2$)$_2$ (LiTFSI), lithium bis(fluorosulfonyl) imide Li(N (SO$_2$F)$_2$) (LiFSI), lithium bis(oxalato)borate LiB(C$_2$O$_4$)$_2$ (LiBOB) or lithium difluoro(oxalato)borate LiBF$_2$(C$_2$O$_4$) (LiDFOB).

In some embodiments, the concentration of the lithium salt in the electrolytic solution is: about 0.5 to 3 mol/L, about 0.5 to 2 mol/L, or about 0.8 to 1.5 mol/L.

VI. Separator

In some embodiments, a separator is disposed between the cathode and the anode to prevent a short circuit. The material and shape of the separator that can be used in the embodiments of the present application are not particularly limited, and may be any technology disclosed in the prior art. In some embodiments, the separator includes a polymer or an inorganic substance formed by a material stable in the electrolytic solution of the present application.

For example, the separator may include a substrate layer and a surface treatment layer. The substrate layer is a non-woven fabric, a film or a composite film having a porous structure. The material of the substrate layer is selected from at least one of polyethylene, polypropylene, polyethylene terephthalate and polyimide. Specifically, a porous polypropylene film, a porous polyethylene film, a polypropylene non-woven fabric, a polyethylene non-woven fabric, or a porous polypropylene-polyethylene-polypropylene composite film may be used.

The surface treatment layer is disposed on at least one surface of the substrate layer. The surface treatment layer may be a polymer layer or an inorganic substance layer, or a layer formed by mixing the polymer and the inorganic substance.

The inorganic substance layer includes inorganic particles and a binder. The inorganic particles are one or a combination of several selected from the group consisting of aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is one or a combination of several selected from the group consisting of polyvinylidene fluoride, a vinylidene fluoride-hexafluoropropylene copolymer, polyamide, polyacrylonitrile, polyacrylic ester, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is selected from at least one of polyamide, polyacrylonitrile, an acrylate polymer, polyacrylic acid, polyacrylate, polyvinylpyrrolidone, polyvinyl ether, polyvinylidene fluoride or poly(vinylidene fluoride-hexafluoropropylene).

VII. Electrochemical Device

The embodiments of the present application provide an electrochemical device including any device that undergoes an electrochemical reaction.

In some embodiments, the electrochemical device of the present application includes a cathode having a cathode active material capable of retaining and releasing metal ions; an anode according to the embodiments of the present application; an electrolytic solution; and a separator disposed between the cathode and the anode.

In some embodiments, the electrochemical device of the present application includes, but is not limited to, all kinds of primary batteries, secondary batteries, fuel batteries, solar batteries, or capacitors.

In some embodiments, the electrochemical device is a lithium ion battery. In some embodiments, the electrochemical device is a lithium secondary battery.

In some embodiments, the lithium secondary battery includes, but is not limited to, a lithium metal secondary battery, a lithium ion secondary battery, a lithium polymer secondary battery, or a lithium ion polymer secondary battery.

VIII. Electronic Device

The electronic device of the present application may be any device using the electrochemical device according to the embodiments of the present application.

In some embodiments, the electronic device includes, but is not limited to, a notebook computer, a pen input computer, a mobile computer, an e-book player, a portable telephone, a portable fax machine, a portable copy machine, a portable printer, a stereo headphone, a video recorder, a liquid crystal display television, a portable cleaner, a portable CD player, a minidisk player, a transceiver, an electronic notebook, a calculator, a memory card, a portable recorder, a radio, a backup power supply, a motor, a car, a motorcycle, a power-assisted bicycle, a bicycle, a lighting fixture, a toy, a game console, a clock, an electric tool, a flash light, a camera, a large household storage battery, or a lithium ion capacitor, and the like.

The lithium ion battery is taken as an example and the preparation of the lithium-ion battery is described in conjunction with specific embodiments. Those skilled in the art would understand that the preparation method described in the present application is only an example, and any other suitable preparation methods are within the scope of the present application.

Embodiment

The following describes embodiments of the lithium-ion battery according to the present application and comparative examples for performance evaluation.

I. Anode Material Powder Property Test Method (1) X-ray diffraction (XRD) test: 1.0 to 2.0 g of a sample was added to a groove of a glass sample holder, and was compacted and flattened with a glass sheet. A Brooker, D8 X-ray diffractometer was used for a test according to the "General Rules for X-ray Diffraction Analysis Method JJS K 0131-1996". The test voltage was 40 kV, the current was 30 mA, the scanning angle was in the range of 10 to 40°, the scanning step size was 0.0167°, and the time for each step length was 0.24 s, thus obtaining an XRD diffraction pattern.

(2) Energy dispersive spectroscopy (EDS) line scanning test method: EDS line scanning was characterized by OXFORD-EDS, and the voltage was 20 kV.

(3) Test with a scanning electron microscope (SEM): SEM characterization was recorded by a PhilipsXL-30 type field emission SEM and the test was performed under the conditions of 10 kV and 10 mA.

(4) Shell layer thickness test method: The thickness of the shell layer was obtained by measuring the thickness of the shell layer on the surface of the profile of the particle in the SEM image of the particle.

(5) Determination method of the content of each element in a silicon-based anode active material:

About 0.2 g of the silicon-based anode active material was placed in a polytetrafluoroethylene (PTFE) beaker, and the weight of the sample was recorded after a measured value on a digital balance was stable (accurate to 0.0001 g). About 10 mL of concentrated $HNO_3$ and about 2 mL of HF were slowly added to the sample, and the sample was placed on a plate heater at about 220° C. and was heated and digested until it was almost evaporated to dryness. About 10 mL of nitric acid was slowly added and was continuously heated and digested for about 15 min, so that the sample was fully dissolved. The dissolved sample was placed in a fume cupboard and cooled to room temperature. A sample solution was shaken well and slowly poured into a funnel with a single layer of filter paper, and the beaker and filter residue were rinsed for 3 times. The solution was adjusted to a volume of about 50 mL at about 20±5° C. and shaken well. An inductively coupled plasma (ICP) emission spectrometer (PE 7000) was used to test the ion spectral intensity of filtrate, and the ion concentration of the filtrate was calculated according to a standard curve, thereby calculating the content of elements in the sample.

II. Electrical Performance Test Method for the Anode Active Material

1. Button Battery Preparation and Charge and Discharge Capacity Test Method:

Under a dry argon environment, $LiPF_6$ was added to a solvent formed by mixing propylene carbonate (PC), ethylene carbonate (EC), and diethyl carbonate (DEC) (a weight ratio was about 1:1:1), and was then uniformly mixed. The concentration of $LiPF_6$ was about 1.15 mol/L. Then about 7.5 wt % of fluoroethylene carbonate (FEC) was added and mixed uniformly to obtain the electrolytic solution.

The silicon-based anode active material obtained in the embodiments and comparative examples, conductive carbon black and a modified polyacrylic acid (PAA) binder were added to deionized water at a weight ratio of about 80:10:10, and were stirred to form a slurry. A scraper was used for coating to form a coating layer with the thickness of about 100 μm. The coating layer was dried in a vacuum drying oven at about 85° C. for about 12 hr, and then cut into a wafer with a diameter of about 1 cm with a punching machine in a dry environment. A lithium metal sheet was used as a counter electrode in a glove box. A Celgard composite membrane was used as a separator, and an electrolytic solution was added to assemble a button battery. A LAND series battery test was used to perform charge and discharge tests on the button battery.

The battery was discharged to 5 mV at a constant current at a rate of 0.05 C and discharged at a constant voltage of 5 mV until the current was lowered to 10 μA, and then was charged to 2 V at a constant current at a rate of 0.05 C, completing the charge and discharge capacity tests. The first Coulombic efficiency of the battery was the ratio of charge capacity to the discharge capacity.

2. Cycle Performance Test:

The test temperature was 25° C. The button battery prepared above was discharged to 5 mV at a constant current at a rate of 0.05 C and discharged at a constant voltage of 5 mV until the current was lowered to 10 μA, and then was charged to 2 V at a constant current at a rate of 0.05 C, completing 1 charge and discharge cycle. The above charge and discharge cycle was repeated to test the cycle performance of the button battery.

III. Preparation of the Silicon-Based Anode Active Material

2. The Silicon-Based Anode Active Material in Embodiment 1 was Prepared According to the Following Method:

micro silicon particles (with the average particle size Dv50=4 μm) were placed in a tube furnace with air and subjected to heat treatment at 800° C. for 5 hr to obtain a silicon material with a silicon oxide shell layer;

after the oxidized silicon particles (hereinafter referred to as "A1") and carbon nanotubes were mixed at a weight ratio of 99:1, and ball milling treatment was performed in a ball milling tank for 4 hr at a rotary speed of 300 r/min;

the silicon material subjected to the ball milling (hereinafter referred to as "A2") in step (2) and nano magnesium oxide were mixed in a V-type mixer at a weight ratio of 95:5, and then were subjected to heat treatment at 1100° C. for 2 hr in the tube furnace with argon; and the silicon material obtained in step (3) (hereinafter referred to as "A3") and lithium hydride powder were mixed at a weight ratio of 98:2, and were subjected to heat treatment at 600° C. for 2 hr in the tube furnace with the argon to obtain silicon-based particles as the silicon-based anode active material.

The preparation methods of the silicon-based anode active material in Embodiments 2 to 9 and Comparative Examples 2 and 3 were similar to the preparation method in Embodiment 1, and merely differ in the amount of carbon nanotubes, nano magnesium oxide, or lithium hydride powder (referring to Table 1 for detail). When the content of the carbon nanotubes, nano magnesium oxide, or lithium hydride powder is 0, it indicates that the corresponding steps have not been performed. The silicon-based anode active material in Comparative Example 1 is micro silicon per se.

Table 1 shows the weight ratios of substances used in the preparation methods for the silicon-based anode active material in Embodiments 1 to 9 and Comparative Examples 1 to 3.

TABLE 1

| Sample | Oxidization treatment | Weight ratio of A1 to carbon nanotubes | Weight ratio of A2 to nano magnesium oxide | Weight ratio of A3 to lithium hydride |
|---|---|---|---|---|
| Embodiment 1 | Yes | 99:1 | 95:5 | 98:2 |
| Embodiment 2 | Yes | 99:1 | 95:5 | 99:1 |
| Embodiment 3 | Yes | 99:1 | 95:5 | 97:3 |
| Embodiment 4 | Yes | 99:1 | 98:2 | 98:2 |
| Embodiment 5 | Yes | 99:1 | 92:8 | 98:2 |
| Embodiment 6 | Yes | 99:1 | 95:5 | 100:0 |
| Embodiment 7 | Yes | 98:2 | 95:5 | 100:0 |
| Embodiment 8 | Yes | 97:3 | 95:5 | 100:0 |
| Embodiment 9 | Yes | 100:0 | 95:5 | 98:2 |
| Comparative Example 1 | No | 100:0 | 100:0 | 100:0 |
| Comparative Example 2 | Yes | 99:1 | 100:0 | 98:2 |
| Comparative Example 3 | Yes | 99:1 | 100:0 | 100:0 |

Table 2 shows compositions of the silicon-based anode active material in Embodiments 1 to 9 and Comparative Examples 1 to 3.

TABLE 2

| Sample | Material of first shell layer | Thickness of first shell layer | Material of second shell layer | Thickness of second shell layer | Content of Li (wt %) | Content of Mg (wt %) | Content of C (wt %) | Content of Si (wt %) |
|---|---|---|---|---|---|---|---|---|
| Embodiment 1 | $Li_2SiO_3$ + $Mg_2SiO_4$ | 93 nm | Carbon | 5 nm | 1.75 | 2.94 | 0.93 | 91.2 |
| Embodiment 2 | $Li_2SiO_3$ + $Mg_2SiO_4$ | 92 nm | Carbon | 5 nm | 0.88 | 2.97 | 0.94 | 92.0 |
| Embodiment 3 | $Li_2SiO_3$ + $Mg_2SiO_4$ | 94 nm | Carbon | 5 nm | 2.63 | 2.91 | 0.92 | 90.3 |
| Embodiment 4 | $Li_2SiO_3$ + $Mg_2SiO_4$ | 89 nm | Carbon | 5 nm | 1.75 | 1.18 | 0.96 | 97.9 |
| Embodiment 5 | $Li_2SiO_3$ + $Mg_2SiO_4$ | 99 nm | Carbon | 5 nm | 1.75 | 4.70 | 0.90 | 89.4 |
| Embodiment 6 | $Mg_2SiO_4$ | 91 nm | Carbon | 5 nm | 0 | 3.0 | 0.95 | 92.8 |
| Embodiment 7 | $Mg_2SiO_4$ | 91 nm | Carbon | 9 nm | 0 | 3.0 | 1.90 | 91.9 |
| Embodiment 8 | $Mg_2SiO_4$ | 91 nm | Carbon | 13 nm | 0 | 3.0 | 2.91 | 90.9 |
| Embodiment 9 | $Li_2SiO_3$ + $Mg_2SiO_4$ | 93 nm | None | 0 | 1.75 | 2.94 | 0 | 92.1 |
| Comparative Example 1 | None | 0 | None | 0 | 0 | 0.0 | 0 | 100.0 |
| Comparative Example 2 | $Li_2SiO_3$ | 86 nm | Carbon | 5 nm | 1.75 | 0.0 | 0.98 | 94.0 |
| Comparative Example 3 | $SiO_2$ | 80 nm | Carbon | 5 nm | 0 | 0.0 | 1.0 | 95.8 |

Table 3 shows performance test results of the button battery prepared using the silicon-based anode active material in Embodiments 1 to 9 and Comparative Examples 1 to 3.

TABLE 3

| Sample | Specific capacity (mAh/g) | First Coulombic efficiency | Capacity retention rate after 20 cycles |
|---|---|---|---|
| Embodiment 1 | 2609 | 88.9% | 88.7% |
| Embodiment 2 | 2638 | 88.6% | 88.0% |
| Embodiment 3 | 2531 | 89.0% | 87.9% |
| Embodiment 4 | 2683 | 88.4% | 87.6% |
| Embodiment 5 | 2536 | 89.0% | 88.8% |
| Embodiment 6 | 2636 | 88.7% | 88.0% |
| Embodiment 7 | 2552 | 88.1% | 88.3% |
| Embodiment 8 | 2498 | 87.6% | 88.8% |
| Embodiment 9 | 7675 | 89.0% | 88.3% |
| Comparative Example 1 | 2800 | 89.2% | 45.0% |
| Comparative Example 2 | 7541 | 88.5% | 84.0% |
| Comparative Example 3 | 7720 | 87.1% | 73.0% |

It can be seen from the performance test results of Embodiments 1 to 9 and Comparative Examples 1 to 3 that, after micro silicon is oxidized, the carbon layer is prepared on the surface of the micro silicon; and the micro silicon is doped with magnesium and/or lithium. Such a treatment can significantly improve the cycle performance of the battery, and the first Coulombic efficiency does not change significantly.

Figure 6:
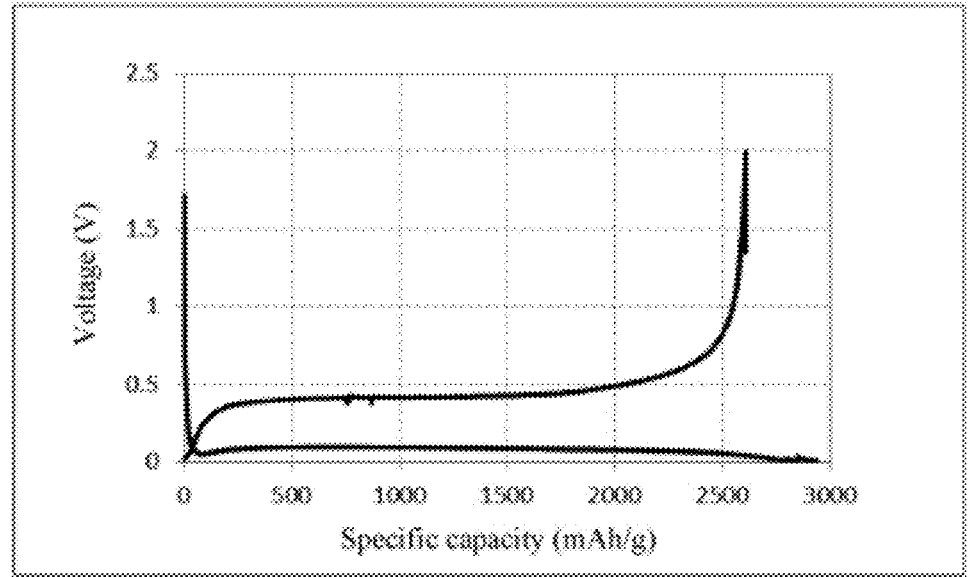
FIG. 6 illustrates a charge/discharge curve obtained from a button battery test in Embodiment 1 of the present application.

FIG. 6 illustrates a charge/discharge curve obtained from a button battery test in Embodiment 1 of the present application. It can be seen that the silicon-based anode active material in Embodiment 1 has relatively high discharge specific capacity and first Coulombic efficiency.

Figure 7:
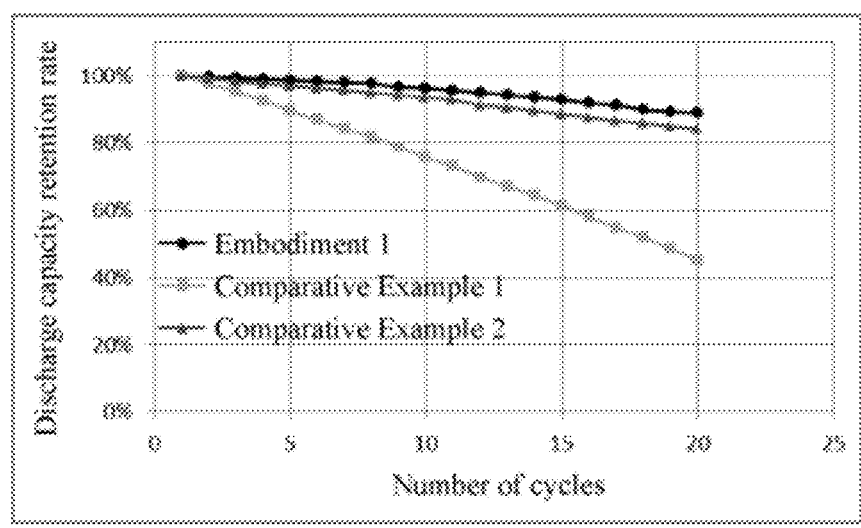
FIG. 7 illustrates cyclic curves obtained from button battery tests in Embodiment 1, Comparative Example 1, and Comparative Example 2 of the present application.

FIG. 7 illustrates cyclic curves obtained from button battery tests in Embodiment 1, Comparative Example 1, and Comparative Example 2 of the present application. It can be seen from FIG. 7 that the cycle performance of the button battery in Embodiment 1 is significantly higher than the cycle performance of the button battery in Comparative Example 1.

Throughout the specification, references to "some embodiments", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments", "in an embodiment", "in one embodiment", "in another example", "in an example", "in a particular example" or "for example" are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An anode material, comprising silicon-based particles, wherein
   the silicon-based particles comprise a silicon-containing substrate;
   at least a part of a surface of the silicon-containing substrate is coated with a coating layer;
   wherein the coating layer comprises $SrSiO_3$.

2. The anode material according to claim 1, wherein a thickness of the coating layer is 50 to 150 nm.

3. The anode material according to claim 1, wherein at least a part of a surface of the coating layer is coated with a carbon layer; a thickness of the carbon layer is 1 to 500 nm; and a weight percentage of the carbon layer is 0.1 wt % to 10 wt % based on a total weight of the silicon-based particles.

4. The anode material according to claim 3, wherein the thickness of the carbon layer is 100 to 400 nm.

5. The anode material according to claim 3, wherein the weight percentage of the carbon layer is 0.5 wt % to 8 wt % based on the total weight of the silicon-based particles.

6. The anode material according to claim 1, wherein the silicon-containing substrate comprises micro Si, nano Si, or a combination thereof.

7. A method for preparing the anode material of claim 1, wherein the method comprises:
   (1) performing thermal oxidization treatment on the surface of the silicon-containing substrate to obtain a silicon material with silicon dioxide on the surface; and
   (2) mixing the silicon material with silicon dioxide on the surface and an M source, and heat-treating the mixed material at 400 to 1600° C. for 1 to 5 hr to obtain the anode material, wherein the M source comprises.

8. An anode, comprising an anode material, the anode material comprises silicon-based particles, wherein
   the silicon-based particles comprise a silicon-containing substrate;
   at least a part of a surface of the silicon-containing substrate is coated with a coating layer;
   wherein the coating layer comprises $SrSiO_3$.

9. The anode according to claim 8, wherein at least a part of a surface of the coating layer is coated with a carbon layer; a thickness of the carbon layer is 1 to 500 nm; and a weight percentage of the carbon layer is 0.1 wt % to 10 wt % based on a total weight of the silicon-based particles.

10. The anode according to claim 8, wherein the silicon-containing substrate comprises micro Si, nano Si, or a combination thereof.

11. An electrochemical device, wherein the electrochemical device comprises the anode according to claim 10.

12. An electronic device, wherein the electronic device comprises the electrochemical device according to claim 11.

13. The anode material according to claim 1, wherein the coating layer further comprises at least one compound represented by formula $M_ySiO_z$; M comprises Li, Mg, Ca, Ba, Al, Ti, Zn, or any combination thereof; and $0<y<3$, and $0.5<z<6$.

14. The anode material according to claim 13, wherein M further comprises Li; and a weight percentage of the element Li is greater than 0 wt % and less than or equal to 5 wt % based on a total weight of the silicon-based particles.

15. The anode material according to claim 14, wherein the weight percentage of the element Li is 1 wt % to 4 wt % based on the total weight of the silicon-based particles.

16. The anode material according to claim 13, wherein the $M_ySiO_z$ compound comprises $Li_2SiO_3$, $Li_2Si_2O_5$, $Mg_2SiO_4$, $MgSiO_3$, $CaSiO_3$, $BaSiO_3$, $Al_2SiO_5$, $TiSiO_4$, $Zn_2SiO_4$, or any combination thereof; and a thickness of the coating layer is 50 to 200 nm.

17. The anode material according to claim 13, wherein M represents a metal element in the $M_ySiO_z$ compound, a weight percentage of Sr and the metal element M is 0.5 wt % to 15 wt % based on a total weight of the silicon-based particles.

18. The anode material according to claim 13, wherein M represents a metal element in the $M_ySiO_z$ compound, a weight percentage of Sr and the metal element M is 1 wt % to 12 wt % based on a total weight of the silicon-based particles.

19. The anode according to claim 8, wherein the coating layer further comprises at least one compound represented by formula $M_ySiO_z$; M comprises Li, Mg, Ca, Ba, Al, Ti, Zn, or any combination thereof; and $0<y<3$, and $0.5<z<6$.

20. The anode according to claim 19, wherein M further comprises Li; and a weight percentage of the element Li is greater than 0 wt % and less than or equal to 5 wt % based on a total weight of the silicon-based particles.

21. The anode according to claim 20, wherein the weight percentage of the element Li is 1 wt % to 4 wt % based on the total weight of the silicon-based particles.

22. The anode according to claim 19, wherein the $M_ySiO_z$ compound comprises $Li_2SiO_3$, $Li_2Si_2O_5$, $Mg_2SiO_4$, $MgSiO_3$, $CaSiO_3$, $BaSiO_3$, $Al_2SiO_5$, $TiSiO_4$, $Zn_2SiO_4$, or any combination thereof; and a thickness of the coating layer is 50 to 200 nm.

23. The anode according to claim 19, wherein M represents a metal element in the $M_ySiO_z$ compound, and a weight percentage of Sr and the metal element M is 0.5 wt % to 15 wt % based on a total weight of the silicon-based particles.

* * * * *